United States Patent
McGhee

[11] Patent Number: 5,999,540
[45] Date of Patent: Dec. 7, 1999

[54] RATE ADAPTIVE XDSL COMMUNICATION SYSTEM AND METHOD

[75] Inventor: David Wesley McGhee, Austin, Tex.

[73] Assignee: Cisco Technology, Inc., San Jose, Calif.

[21] Appl. No.: 09/219,148

[22] Filed: Dec. 22, 1998

[51] Int. Cl.⁶ .................................................... H04D 1/00
[52] U.S. Cl. ........................ 370/465; 370/437; 370/466; 370/469; 375/222; 375/232; 379/93.06; 379/93.31
[58] Field of Search ................................... 370/465, 466, 370/467, 468, 469, 391, 437; 375/222, 225, 232; 379/93.01, 93.05, 93.06, 93.31

[56] References Cited

U.S. PATENT DOCUMENTS

| | | | |
|---|---|---|---|
| 3,532,827 | 10/1970 | Ewin | 179/18 |
| 3,821,484 | 6/1974 | Sternung et al. | 179/18 EB |
| 4,002,849 | 1/1977 | Kotler et al. | 179/18 EB |
| 4,282,408 | 8/1981 | Stauers | 179/18 FA |
| 4,438,511 | 3/1984 | Baran | 370/19 |
| 4,665,514 | 5/1987 | Ching et al. | 370/60 |
| 4,679,227 | 7/1987 | Hughes-Hartogs | 379/98 |
| 4,731,816 | 3/1988 | Hughes-Hartogs | 379/98 |
| 4,757,495 | 7/1988 | Decker et al. | 370/76 |
| 4,782,512 | 11/1988 | Hutton | 379/98 |
| 4,833,706 | 5/1989 | Hughes-Hartogs | 379/98 |
| 4,841,561 | 6/1989 | Hill | 379/97 |
| 4,949,355 | 8/1990 | Dyke et al. | 375/10 |
| 4,980,897 | 12/1990 | Decker et al. | 375/38 |
| 5,025,469 | 6/1991 | Bingham | 379/98 |
| 5,054,034 | 10/1991 | Hughes-Hartogs | 375/8 |
| 5,119,402 | 6/1992 | Ginzburg et al. | 375/17 |
| 5,134,611 | 7/1992 | Steinka et al. | 370/79 |
| 5,185,763 | 2/1993 | Krishnan | 375/39 |
| 5,198,818 | 3/1993 | Samueli et al. | 341/144 |
| 5,199,071 | 3/1993 | Abe et al. | 379/38 |
| 5,202,884 | 4/1993 | Close et al. | 370/94.1 |
| 5,206,886 | 4/1993 | Bingham | 375/97 |
| 5,214,650 | 5/1993 | Renner et al. | 370/110.1 |
| 5,222,077 | 6/1993 | Krishnan | 375/39 |
| 5,228,062 | 7/1993 | Bigham | 375/97 |

(List continued on next page.)

FOREIGN PATENT DOCUMENTS

| | | |
|---|---|---|
| 62-084646 | 4/1987 | Japan . |
| 62-222755 | 9/1987 | Japan . |
| 63-76648 | 4/1988 | Japan . |
| 02271763 | 11/1990 | Japan . |
| 04100367 | 4/1992 | Japan . |
| WO86/02796 | 5/1986 | WIPO . |
| WO/9737458 | 10/1997 | WIPO . |

OTHER PUBLICATIONS

Horst Hessenmüller, et al., Zugangsnetzstrukuren für interaktive Videodienste (Teil 1), *Fernmelde Ingenieur, Der,* vol. 48, No. 8, XP000647017, Aug., 1994, Germany, pp. 1–32 (with English Translation).

(List continued on next page.)

*Primary Examiner*—Dang Ton
*Assistant Examiner*—Tuan Ho
*Attorney, Agent, or Firm*—Baker & Botts, L.L.P.

[57] ABSTRACT

A rate adaptive digital subscriber line (XDSL) communication system and method are disclosed. An XDSL link for XDSL equipment is trained at a data rate set by a baud rate and a constellation size. Actual operating characteristics of the XDSL equipment are then obtained from parameters for the trained XDSL link. One or more rate adaptive data tables storing empirical data for performance of the XDSL equipment are accessed. Then, it is determined whether the trained data rate will provide a desired bit error rate using the actual operating characteristics and the empirical data from the accessed one or more of the rate adaptive data tables. In one embodiment, if the trained data rate will not provide the desired bit error rate, a new data rate is selected using the empirical data and the actual operating characteristics. Then, the XDSL link is trained using the new data rate, and the process is repeated. Further, in one embodiment, the actual operating characteristics used comprise the actual receiver gain and signal-to-noise ratio, and the empirical data comprises specified receiver gains, signal-to-noise ratios, baud rates and constellation sizes used to achieve a desired bit error rate.

16 Claims, 2 Drawing Sheets

U.S. PATENT DOCUMENTS

| | | | |
|---|---|---|---|
| 5,247,347 | 9/1993 | Litteral et al. | 358/85 |
| 5,282,155 | 1/1994 | Jones | 364/724.19 |
| 5,285,474 | 2/1994 | Chow et al. | 375/13 |
| 5,293,402 | 3/1994 | Crespo et al. | 375/14 |
| 5,295,159 | 3/1994 | Kerpez | 375/38 |
| 5,331,670 | 7/1994 | Sorbara et al. | 375/111 |
| 5,337,348 | 8/1994 | Yamazaki et al. | 379/94 |
| 5,339,355 | 8/1994 | Mori et al. | 379/94 |
| 5,341,474 | 8/1994 | Gelman et al. | 395/200 |
| 5,345,437 | 9/1994 | Ogawa | 370/13 |
| 5,367,540 | 11/1994 | Kakuishi et al. | 375/103 |
| 5,371,532 | 12/1994 | Gelman et al. | 348/7 |
| 5,379,441 | 1/1995 | Watanabe et al. | 395/800 |
| 5,390,239 | 2/1995 | Morris et al. | 379/93 |
| 5,400,322 | 3/1995 | Hunt et al. | 370/19 |
| 5,404,388 | 4/1995 | Eu | 379/24 |
| 5,408,260 | 4/1995 | Arnon | 348/6 |
| 5,408,522 | 4/1995 | Ikehata et al. | 379/98 |
| 5,408,614 | 4/1995 | Thornton et al. | 395/275 |
| 5,410,264 | 4/1995 | Lechleider | 327/311 |
| 5,410,343 | 4/1995 | Coddington et al. | 348/7 |
| 5,414,455 | 5/1995 | Hooper et al. | 348/7 |
| 5,414,733 | 5/1995 | Turner | 375/233 |
| 5,422,876 | 6/1995 | Turudic | 370/15 |
| 5,428,608 | 6/1995 | Freeman et al. | 370/60.1 |
| 5,430,793 | 7/1995 | Ueltzen et al. | 379/93 |
| 5,440,335 | 8/1995 | Beveridge | 348/13 |
| 5,442,390 | 8/1995 | Hooper et al. | 348/7 |
| 5,453,779 | 9/1995 | Dan et al. | 348/7 |
| 5,461,415 | 10/1995 | Wolf et al. | 348/7 |
| 5,461,616 | 10/1995 | Suzuki | 370/79 |
| 5,461,640 | 10/1995 | Gatherer | 375/231 |
| 5,469,495 | 11/1995 | Beveridge | 379/56 |
| 5,475,735 | 12/1995 | Williams et al. | 379/59 |
| 5,477,263 | 12/1995 | O'Callaghan et al. | 348/7 |
| 5,479,447 | 12/1995 | Chow et al. | 375/260 |
| 5,495,483 | 2/1996 | Grube et al. | 370/95.1 |
| 5,504,736 | 4/1996 | Cubbison, Jr. | 370/13 |
| 5,504,753 | 4/1996 | Renger et al. | 371/20.1 |
| 5,506,868 | 4/1996 | Cox et al. | 375/222 |
| 5,513,251 | 4/1996 | Rochkind et al. | 379/93 |
| 5,528,585 | 6/1996 | Cooley et al. | 370/56 |
| 5,546,379 | 8/1996 | Thaweethai et al. | 370/17 |
| 5,555,244 | 9/1996 | Gupta et al. | 370/60.1 |
| 5,574,724 | 11/1996 | Bales et al. | 370/68.1 |
| 5,583,872 | 12/1996 | Albrecht et al. | 370/476 |
| 5,598,406 | 1/1997 | Albrecht et al. | 370/296 |
| 5,600,712 | 2/1997 | Hanson et al. | 379/142 |
| 5,602,902 | 2/1997 | Satterlund et al. | 379/59 |
| 5,631,897 | 5/1997 | Pacheo et al. | 370/237 |
| 5,649,001 | 7/1997 | Thomas et al. | 379/93.07 |
| 5,668,857 | 9/1997 | McHale | 379/93.07 |
| 5,678,004 | 10/1997 | Thaweethai | 595/187.01 |
| 5,687,176 | 11/1997 | Wisniewski et al. | 370/476 |
| 5,737,364 | 4/1998 | Cohen et al. | 375/220 |
| 5,751,701 | 5/1998 | Langberg et al. | 370/281 |
| 5,756,280 | 5/1998 | Soora et al. | 455/4.2 |
| 5,770,950 | 6/1998 | Zurcher et al. | 326/30 |
| 5,781,617 | 7/1998 | McHale et al. | 379/93.14 |
| 5,799,017 | 8/1998 | Gupta et al. | 370/419 |
| 5,812,786 | 9/1998 | Seaholtz et al. | 395/200.63 |
| 5,852,655 | 12/1998 | McHale et al. | 379/93.14 |
| 5,889,470 | 3/1999 | Kaycee et al. | 370/438 |
| 5,896,383 | 4/1999 | Wakeland | 370/466 |
| 5,898,761 | 4/1999 | McHale et al. | 379/93.01 |
| 5,905,781 | 5/1999 | McHale et al. | 379/93.14 |
| 5,930,340 | 7/1999 | Bell | 370/488 |

OTHER PUBLICATIONS

Horst Hessenmüller, et al., Zugangsnetzstrukturen für interaktive Videodienste (Teil 2), *Fernmelde–Ingenieur*, vol. 48, No. 9, XP000619688, Sep., 1994, Germany, pp. 1–28 (with English translation).

RATE ADAPTIVE XDSL COMMUNICATION SYSTEM AND METHOD

TECHNICAL FIELD OF THE INVENTION

The present invention relates in general to XDSL communication systems and, more particularly, to a rate adaptive XDSL communication system and method.

BACKGROUND OF THE INVENTION

In XDSL communication systems, there can be provisions made for adapting the rate at which data is communicated across the XDSL link. Rate Adaptive DSL (RADSL) is one example of such a system. In general, the data rate across an XDSL link is determined by the baud rate and the number of bits per symbol, or constellation. Thus, the data rate can be adjusted by adjusting either the baud rate or the size of the constellation.

Typically, conventional XDSL chip sets implement rate adaptive algorithms that provide a choice of rate based solely upon the signal-to-noise ratio (SNR). However, these schemes typically take too long to functions. Further, they often do not work because a given signal-to-noise ratio does not guarantee the desired performance (e.g., $10^{-7}$ bit error rate) at the desired rate. This is true in part because the chip set is assuming performance based upon relatively constant noise, when, in fact, real world physical connections do not typically experience constant patterns of noise. Thus, the conventional rate adaptive algorithms are incorrect on some types of noise models and do not accurately select the appropriate rate.

SUMMARY OF THE INVENTION

In accordance with the present invention, a rate adaptive XDSL communication system and method are provided that provide significant advantages over conventional XDSL communication systems.

According to one aspect of the present invention, a rate adaptive digital subscriber line (XDSL) communication system and method train an XDSL link for XDSL equipment at a data rate set by a baud rate and a constellation size. Actual operating characteristics of the XDSL equipment are then obtained from parameters for the trained XDSL link. One or more rate adaptive data tables storing empirical data for performance of the XDSL equipment are accessed. Then, it is determined whether the trained data rate will provide a desired bit error rate using the actual operating characteristics and the empirical data from the accessed one or more of the rate adaptive data tables. In one embodiment, if the trained data rate will not provide the desired bit error rate, a new data rate is selected using the empirical data and the actual operating characteristics. Then, the XDSL link is trained using the new data rate, and the process is repeated. Further, in one embodiment, the actual operating characteristics used comprise the actual receiver gain and signal-to-noise ratio, and the empirical data comprises specified receiver gains, signal-to-noise ratios, baud rates and constellation sizes used to achieve a desired bit error rate.

It is a technical advantage of the present invention to use receiver gain and signal-to-noise ratio (SNR) together to choose a data rate. This selection makes the communication immune to characteristics of the noise because, for a given signal to noise ratio and receiver gain, the performance of the XDSL transceiver can be empirically determined and stored in rate adaptive data tables.

It is another technical advantage of the present invention that the rate adaptive data tables can be derived from a whole end-to-end system with simulated noise. This means that the performance of the system is known for a given signal-to-noise ratio and receiver gain and that time consuming bit error rate tests based upon a known bit test pattern do not have to be used.

It is a further technical advantage of the present invention to allow the communication system to verify the current data transfer rate and to use the rate adaptive data tables to estimate the actual signal-to-noise ratio margin and to modify the amount of margin available.

Additional technical advantage of the present invention should be apparent from the drawings and specification.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
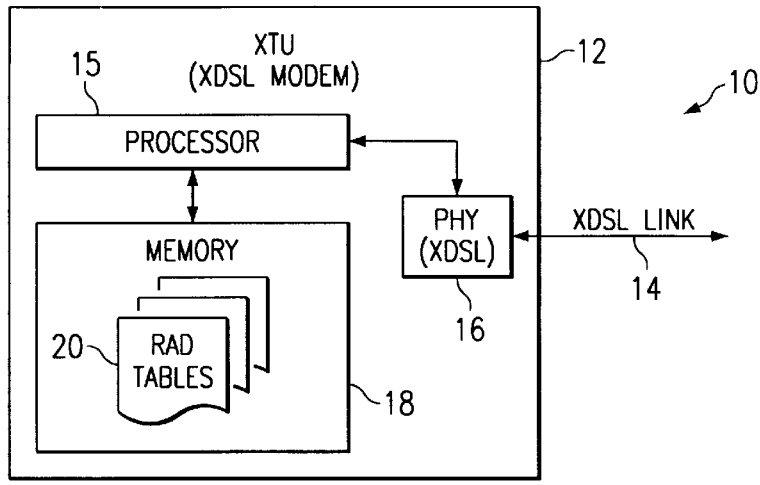
FIG. 1 is a block diagram of one embodiment of a rate adaptive XDSL communication system.

FIG. 1 is a block diagram of one embodiment of a rate adaptive XDSL communication system, indicated generally at 10. As shown, system 10 comprises an XDSL termination unit (XTU) which, for example, can be an ADSL modem. XDSL termination unit 12 communicates across an XDSL link 14 with network equipment such as that located at a telephone system central office or other local loop termination point. In general, XDSL termination unit 12 comprises a processor 14 and a physical layer chip set 16. Physical layer chip set 16 accomplishes communication of bits across the XDSL link 14 under the control of processor 15. Further, as shown, XDSL termination unit 12 comprises a memory 18. Memory 18 can comprise on-board random access memory (RAM), FLASH memory or other appropriate local storage. According to the present invention, memory 18 stores a plurality of rate adaptive data tables 20 which contain look-up information accessible by a processor 15 for setting and analyzing the data rate across XDSL link 14.

Figure 2:
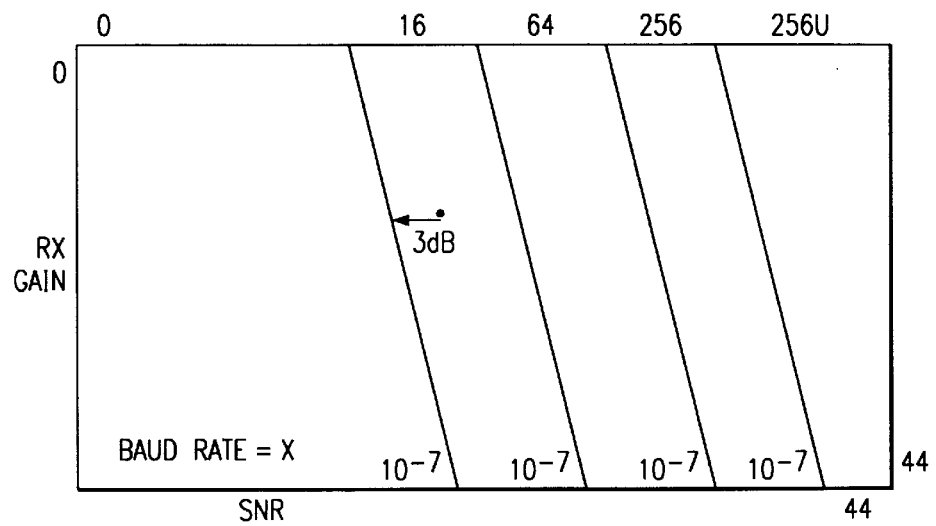
FIG. 2 is a diagram of one embodiment of a rate adaptive data table.

FIG. 2 is a diagram of one embodiment of a rate adaptive data (RAD) table 20. Rate adaptive data table 20 maps data rate information for an end-to-end XDSL link against measured variables. Thus, given certain values for the variables, the performance of the link is known. In the embodiment of FIG. 2, rate adaptive data table 20 maps the constellation size needed to maintain a desired bit error rate (e.g., $10^{-7}$ BER) against receiver gain (RX GAIN) and signal-to-noise ratio (SNR) for a given baud rate. Thus, as shown, rate adaptive data table 20 results in a map showing different constellation sizes (e.g., 16, 64, 256, 256 U) that can be used at the given baud rate to achieve the desired bit error rate for a given combination of receiver gain and signal-to-noise ratio. In FIG. 2, the thresholds drawn across rate adaptive data table 20 indicate where the constellation size change to maintain the bit error rate at the desired level (e.g., $10^{-7}$).

There are, of course, other ways to generate rate adaptive data tables to record the performance of an XDSL link. For example, the table could attempt to describe the receiver gain and signal-to-noise ratio points that follow the desired bit error rate level. This alternative might be more precise than that of FIG. 2, but might also be more difficult to create and manipulate through a software process.

Returning to the embodiment of FIG. 2, rate adaptive data table 20 can be used, given a particular receiver gain, signal-to-noise ratio and baud rate, to make an appropriate selection as to the constellation size to be used such that the desired bit error rate (e.g., $10^{-7}$) is achieved. Further, as shown, a given point within the table can be selected such that there is a given amount of margin (e.g., 3 dB) between the selected setting and the next constellation threshold.

Figure 3:
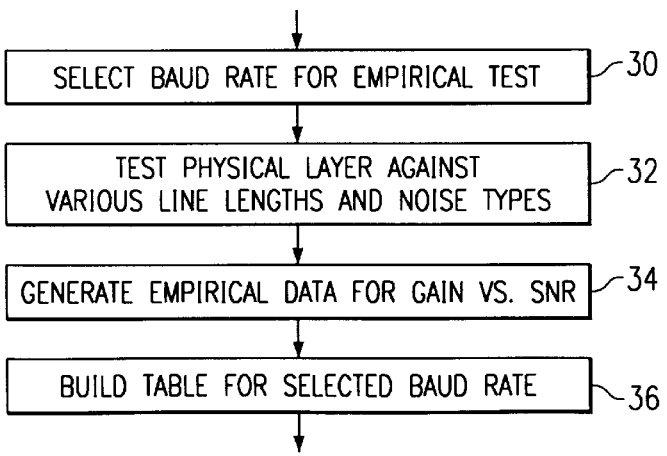
FIG. 3 is a flow chart of one embodiment of a method for generating a rate adaptive data table.

FIG. 3 is a flow chart of one embodiment of a method for generating a rate adaptive data table such as that shown in FIG. 2. For appropriate results, this empirical test and data generation should involve equipment identical to that which will eventually be installed in the field and should involve the physical layer chip set that will be used. In this case, based upon the empirical testing, the operation of the equipment once installed in the field can be accurately predicted.

As shown in FIG. 3, in step 30, a baud rate is selected for an empirical test of an end-to-end XDSL link. Then, in step 32, the physical layer is tested at various data rates against different line lengths and noise types. Using these test conditions, in step 34, empirical data for receiver gain, signal-to-noise ratio and constellation size can be generated for a given baud rate. Then, in step 36, a rate adaptive data table can be built for the selected baud rate. Thus, by using the process of FIG. 3, a series of rate adaptive data tables, such as that of FIG. 2, can be generated for XDSL equipment. Then, by access to such tables and using a known receiver gain and signal-to-noise ratio, the XDSL equipment can select an optimal baud rate and constellation size for achieving desired performance (e.g., $10^{-7}$ bit error rate).

Figure 4:
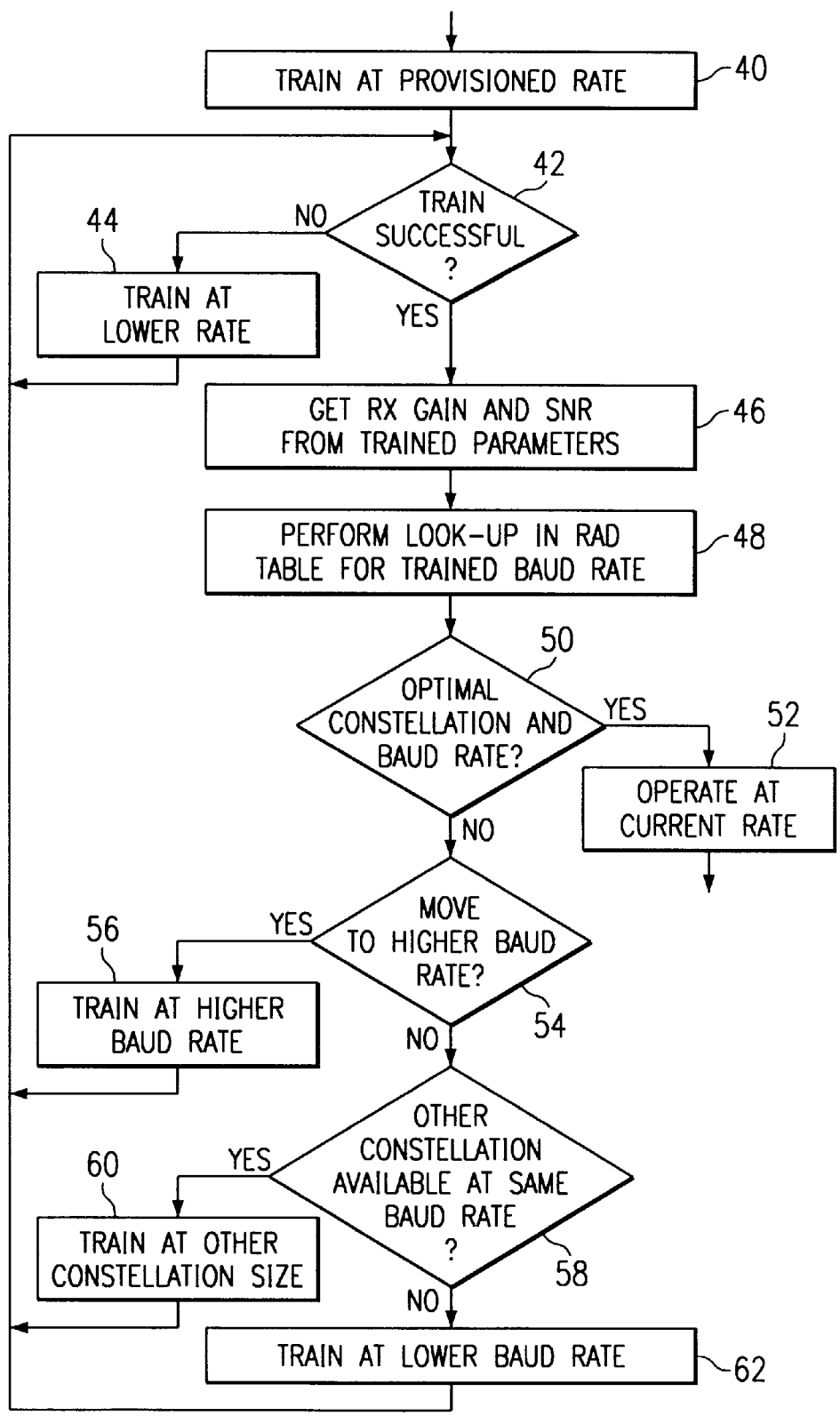
FIG. 4 is a flow chart of one embodiment of a method for selecting an adaptive data rate.

FIG. 4 is a flow chart of one embodiment of a method for selecting an adaptive data rate. As shown, in step 40, the XDSL link is trained at the provisioned rate. Then, in step 42, it is determined whether the train was successful. If not, then the XDSL link is retrained at a lower rate in step 44. In some cases, the lowest possible rate may be chosen to ensure that a successful train is obtained. In other cases, the next lower data rate may be chosen. In any event, after a successful train, the receiver gain and signal-to-noise ratio are retrieved from the trained parameters in step 46. Then, in step 48, a look-up is performed in the appropriate rate adaptive data table. For example, the rate adaptive data table could be a table for the trained baud rate like that shown in FIG. 2.

This look-up uses known parameters of the trained link (e.g., receiver gain and signal-to-noise ratio) to determine whether the link is operating at an optimal data rate and, if not, what change should be made. In this context, "optimal" is used to refer to whether the current data rate best achieves the desired bit error rate and margin. Thus, in step 50, it can be determined whether the link is operating at an optimal data rate (i.e., the optimal baud rate and constellation size). If the data rate is optimal, then, in step 52, the XDSL equipment continues to operate at the current data rate.

Otherwise, it can be determined what change should be made. In step 54, it is determined whether there should be a move to a higher baud rate. If so, the link is trained at the higher baud rate and returns to step 42. If not a higher baud rate then, in step 58, it is determined whether a different constellation size should be used at the same baud rate. If so, the link is trained in step 60 at the different constellation size, and the process returns to step 42. If there is neither a move to a higher baud rate or a different constellation size, then in step 62, the link is trained at a lower baud rate. After step 62, the process continues at step 42 to determine whether the train was successful.

In general, according to the present invention, an appropriate data rate can selected using known current loop conditions. In particular, using the signal-to-noise ratio and receiver gain, an empirically generated rate adaptive table data allows the XDSL equipment to select a data rate that achieves desired performance regardless of noise or loop conditions (e.g., loop link, bridge taps). Another important part of the process is the handling of the data rate transitions. When the baud rate needs to be changed going down, the equipment can start at one of the higher constellation sizes for that baud rate. When baud rate needs to go up, the equipment can start at the lower constellation size for the next higher baud rate. It should be noted that it is possible, using performance testing, to tune the cross baud guessing to eliminate rates that will probably not be used or are actually slower than the higher rate at a lower baud rate.

Although the present invention has been described in detail, it should be understood that various changes, substitutions and alterations can be made thereto without departing from the spirit and scope of the invention as defined by the appended claims.

What is claimed is:

1. A method for rate adaptive digital subscriber line (XDSL) communication, comprising:

training an XDSL link for XDSL equipment at a data rate set by a baud rate and a constellation size;

obtaining actual operating characteristics of the XDSL equipment from parameters for the trained XDSL link;

accessing one or more rate adaptive data tables storing empirical data for performance of the XDSL equipment; and determining whether the trained data rate will provide a desired bit error rate using the actual operating characteristics and the empirical data from the accessed one or more of the rate adaptive data tables.

2. The method of claim 1, further comprising, if the trained data rate will not provide the desired bit error rate:

selecting a new data rate using the empirical data and the actual operating characteristics;

repeating the step of training using the new data rate; and repeating the steps of obtaining, accessing, determining and selecting based upon the newly trained XDSL link at the new data rate.

3. The method of claim 2, wherein the actual operating characteristics comprise an actual receiver gain and signal-to-noise ratio.

4. The method of claim 1, wherein obtaining comprises obtaining an actual receiver gain and signal-to-noise ratio.

5. The method of claim 4, wherein the empirical data stored by the one or more rate adaptive data tables comprises specified receiver gains, signal-to-noise ratios, baud rates and constellation sizes used to achieve a desired bit error rate.

6. The method of claim 5, wherein determining comprises using the empirical data and the actual receiver gain and signal-to-noise ratio.

7. The method of claim 6, wherein selecting a new data rate uses the empirical data and the actual receiver gain and signal-to-noise ratio.

8. The method of claim 1, wherein the XDSL equipment comprises an XDSL modem.

9. A rate adaptive digital subscriber line (XDSL) communication system, comprising:

an XDSL physical layer chip set;

data storage storing one or more rate adaptive data tables which hold empirical data for performance of the XDSL physical layer chip set; and a processor operating to access the data storage and to control the physical layer chip set, the processor further operating:

to train an XDSL link at a data rate set by a baud rate and a constellation size;

to obtain actual operating characteristics from parameters for the trained XDSL link;

to access one or more of the rate adaptive data tables; and to determine whether the trained data rate will provide a desired bit error rate using the actual operating characteristics and the empirical data from the accessed one or more of the rate adaptive data tables.

10. The system of claim 9, wherein, if the trained data rate will not provide the desired bit error rate, the processor further operating:

to select a new data rate using the empirical data and the actual operating characteristics;

to repeat the step of training using the new data rate; and to repeat the steps of obtaining, accessing, determining and selecting based upon the newly trained XDSL link at the new data rate.

11. The system of claim 10, wherein the actual operating characteristics comprise an actual receiver gain and signal-to-noise ratio.

12. The system of claim 9, wherein obtaining comprises obtaining an actual receiver gain and signal-to-noise ratio.

13. The system of claim 12, wherein the empirical data held in the one or more rate adaptive data tables comprises specified receiver gains, signal-to-noise ratios, baud rates and constellation sizes used to achieve a desired bit error rate.

14. The system of claim 13, wherein the processor determines whether the trained data rate will provide a desired bit error rate using the actual receiver gain and signal-to-noise ratio and the empirical data.

15. The system of claim 14, wherein the processor selects a new data rate using the empirical data and the actual receiver gain and signal-to-noise ratio.

16. The system of claim 9, wherein the XDSL physical layer chip set, the data storage and the processor are components of an XDSL modem.

\* \* \* \* \*